US008724426B2

(12) United States Patent
Welker (10) Patent No.: US 8,724,426 B2
(45) Date of Patent: May 13, 2014

(54) MARINE SEISMIC STREAMER SYSTEM CONFIGURATIONS, SYSTEMS, AND METHODS FOR NON-LINEAR SEISMIC SURVEY NAVIGATION

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 910 days.

(21) Appl. No.: 12/131,946

(22) Filed: Jun. 3, 2008

(65) Prior Publication Data
US 2009/0316525 A1  Dec. 24, 2009

(51) Int. Cl.
*G01V 1/38* (2006.01)
(52) U.S. Cl.
USPC .............................................. 367/19; 367/20
(58) Field of Classification Search
USPC ............. 114/242, 253; 327/172, 181; 342/95, 342/463; 367/17, 19, 20, 21, 56, 58, 15, 16, 367/117, 127, 129, 130, 6
See application file for complete search history.

(56) References Cited

U.S. PATENT DOCUMENTS

| | | | |
|---|---|---|---|
| 2,693,862 A | | 11/1954 | Reiber |
| 2,823,375 A | * | 2/1958 | Camp ............................. 342/95 |
| 3,283,293 A | | 11/1966 | Pavey et al. |
| 3,331,050 A | | 7/1967 | Kilmer et al. |
| 3,506,674 A | | 4/1970 | Berger |
| 3,560,912 A | | 2/1971 | Spink et al. |
| 3,605,674 A | | 9/1971 | Weese |
| 3,774,570 A | | 11/1973 | Pearson |
| 3,806,863 A | | 4/1974 | Tilley et al. |
| 3,921,124 A | * | 11/1975 | Payton ............................ 367/17 |
| 3,934,220 A | | 1/1976 | Davis |
| 4,146,870 A | | 3/1979 | Ruehle |
| 4,231,111 A | | 10/1980 | Neeley |
| 4,404,664 A | | 9/1983 | Zachariadis |
| 4,468,663 A | | 8/1984 | Kalt |
| 4,486,863 A | * | 12/1984 | French ............................ 367/15 |
| 4,648,080 A | | 3/1987 | Hargreaves |
| 4,669,067 A | | 5/1987 | Roberts |

(Continued)

FOREIGN PATENT DOCUMENTS

| | | |
|---|---|---|
| EP | 0 321705 A2 | 6/1989 |
| EP | 0 347019 A2 | 12/1989 |

(Continued)

OTHER PUBLICATIONS

PCT Search Report, dated Dec. 23, 2009, Application No. PCT/US2009/045261.

(Continued)

*Primary Examiner* — Isam Alsomiri
*Assistant Examiner* — Daniel L Murphy (57) ABSTRACT

Methods for determining by acoustic ranging relative positions of marine seismic streamers in a network of streamers are described, as well as streamer configurations and systems which overcome weak or non-existent acoustic positioning signals. The acoustic network includes a plurality of acoustic transceiver pairs, and the methods include implementing a network solution-based reconfiguration of the acoustic transceiver pairs. When the network of streamers changes more than a critical amount, the network is reconfigured, the critical amount being when the network solution-based reconfiguration is no longer adequate to provide enough acoustic signals to give reasonable relative positions of the acoustic transceiver pairs in the network due to their spatial relation.

20 Claims, 7 Drawing Sheets

(56) References Cited

U.S. PATENT DOCUMENTS

| | | | |
|---|---|---|---|
| 4,757,482 A | 7/1988 | Fiske, Jr. | |
| 4,803,668 A | 2/1989 | Berryhill et al. | |
| 4,834,181 A | 5/1989 | Uhri et al. | |
| 4,942,991 A | 7/1990 | Lyons | |
| 4,960,183 A | 10/1990 | Young, II | |
| 4,965,773 A | 10/1990 | Marschall | |
| 4,970,696 A | 11/1990 | Crews et al. | |
| 4,970,697 A | 11/1990 | Earley et al. | |
| 4,992,990 A * | 2/1991 | Langeland et al. | 367/19 |
| 4,992,991 A | 2/1991 | Young et al. | |
| 5,300,929 A | 4/1994 | MacLeod | |
| 5,353,223 A | 10/1994 | Norton et al. | |
| 5,430,689 A | 7/1995 | Rigsby et al. | |
| 5,443,027 A | 8/1995 | Owsley et al. | |
| H001490 H | 9/1995 | Thompson et al. | |
| 5,508,973 A | 4/1996 | Mallick et al. | |
| 5,555,531 A | 9/1996 | Booth et al. | |
| 5,668,775 A * | 9/1997 | Hatteland | 367/19 |
| 5,677,893 A | 10/1997 | de Hoop et al. | |
| 5,761,152 A | 6/1998 | Jacobsen et al. | |
| 5,973,995 A * | 10/1999 | Walker et al. | 367/20 |
| 6,044,040 A | 3/2000 | Holland | |
| 6,061,301 A | 5/2000 | Corrigan | |
| 6,175,809 B1 | 1/2001 | Naville | |
| 6,178,381 B1 | 1/2001 | Padhi et al. | |
| 6,285,956 B1 | 9/2001 | Bennett et al. | |
| 6,292,754 B1 | 9/2001 | Thomsen | |
| 6,343,256 B1 | 1/2002 | Winbow et al. | |
| 6,477,111 B1 | 11/2002 | Lunde et al. | |
| 6,525,992 B1 | 2/2003 | Olivier et al. | |
| 6,529,832 B1 | 3/2003 | Kerekes | |
| 6,553,315 B2 | 4/2003 | Kerekes et al. | |
| 6,590,831 B1 | 7/2003 | Bennett et al. | |
| 6,671,223 B2 | 12/2003 | Bittleston | |
| 6,684,160 B1 | 1/2004 | Ozbek et al. | |
| 6,691,038 B2 | 2/2004 | Zajac | |
| 6,714,873 B2 | 3/2004 | Bakulin et al. | |
| 6,837,175 B1 * | 1/2005 | Gieseke | 114/242 |
| 6,847,896 B1 | 1/2005 | Orban et al. | |
| 6,862,531 B2 | 3/2005 | Horne et al. | |
| 6,865,487 B2 | 3/2005 | Charron | |
| 6,932,017 B1 | 8/2005 | Hillesund et al. | |
| 6,944,094 B1 | 9/2005 | Thomsen et al. | |
| 7,065,449 B2 | 6/2006 | Brewster et al. | |
| 7,080,607 B2 | 7/2006 | Hillesund et al. | |
| 7,203,130 B1 | 4/2007 | Welker | |
| 7,239,577 B2 | 7/2007 | Tenghamn et al. | |
| 7,293,520 B2 | 11/2007 | Hillesund et al. | |
| 7,377,224 B2 | 5/2008 | Ryan et al. | |
| 7,391,673 B2 | 6/2008 | Regone et al. | |
| 7,400,552 B2 | 7/2008 | Moldoveanu et al. | |
| 7,403,448 B2 | 7/2008 | Welker et al. | |
| 7,679,990 B2 | 3/2010 | Herkenhoff et al. | |
| 7,952,522 B2 * | 5/2011 | Hohl | 342/463 |
| 7,965,583 B2 | 6/2011 | Thomas | |
| 8,004,930 B2 | 8/2011 | Welker et al. | |
| 2002/0193947 A1 | 12/2002 | Chamberlain | |
| 2003/0067842 A1 | 4/2003 | Sukup et al. | |
| 2003/0125878 A1 | 7/2003 | Bakulin et al. | |
| 2004/0042341 A1 | 3/2004 | Tenghamn et al. | |
| 2004/0066707 A1 | 4/2004 | Tenghamn et al. | |
| 2004/0125697 A1 | 7/2004 | Fleming | |
| 2004/0240319 A1 | 12/2004 | Carvill et al. | |
| 2005/0018537 A1 * | 1/2005 | Welker et al. | 367/21 |
| 2005/0180260 A1 | 8/2005 | Planke et al. | |
| 2005/0180263 A1 | 8/2005 | Lambert et al. | |
| 2005/0194201 A1 | 9/2005 | Tenghamn et al. | |
| 2006/0215489 A1 | 9/2006 | Solheim et al. | |
| 2006/0227657 A1 | 10/2006 | Tveide et al. | |
| 2006/0239117 A1 * | 10/2006 | Singh et al. | 367/20 |
| 2006/0256653 A1 | 11/2006 | Toennessen et al. | |
| 2006/0256654 A1 | 11/2006 | Paulsen | |
| 2006/0285435 A1 | 12/2006 | Robertsson | |
| 2007/0064526 A1 | 3/2007 | Holo | |
| 2007/0104028 A1 | 5/2007 | Van Manen et al. | |
| 2007/0127312 A1 | 6/2007 | Storteig et al. | |
| 2007/0159921 A1 | 7/2007 | Regone et al. | |
| 2007/0165486 A1 | 7/2007 | Moldoveanu et al. | |
| 2007/0274153 A1 | 11/2007 | Bisley et al. | |
| 2008/0008037 A1 | 1/2008 | Welker | |
| 2008/0267010 A1 | 10/2008 | Moldoveau et al. | |
| 2008/0285380 A1 | 11/2008 | Rouquette | |
| 2008/0285381 A1 | 11/2008 | Moldoveanu et al. | |
| 2009/0122640 A1 | 5/2009 | Hill et al. | |
| 2009/0245019 A1 * | 10/2009 | Falkenberg et al. | 367/17 |
| 2009/0262601 A1 | 10/2009 | Hillesund et al. | |
| 2009/0310439 A1 | 12/2009 | Hauan et al. | |
| 2009/0310440 A1 | 12/2009 | Solheim et al. | |
| 2010/0013485 A1 | 1/2010 | Alumbaugh et al. | |
| 2010/0027374 A1 | 2/2010 | Moldoveanu et al. | |
| 2010/0118645 A1 | 5/2010 | Welker et al. | |
| 2010/0142317 A1 | 6/2010 | Moldoveanu et al. | |
| 2010/0238762 A1 | 9/2010 | Hornbostel | |
| 2011/0158041 A1 | 6/2011 | Moldoveanu et al. | |
| 2011/0158042 A1 | 6/2011 | Moldoveanu et al. | |

FOREIGN PATENT DOCUMENTS

| | | |
|---|---|---|
| EP | 0 613025 A1 | 8/1994 |
| EP | 0 613025 B1 | 9/1998 |
| EP | 0 681193 B1 | 8/1999 |
| GB | 2144854 A | 3/1985 |
| GB | 2342081 A | 4/2000 |
| GB | 2390902 A | 1/2004 |
| GB | 2436206 A | 9/2007 |
| WO | 843153 A1 | 8/1984 |
| WO | 9621163 A1 | 7/1996 |
| WO | 9828636 A1 | 7/1998 |
| WO | 0020895 A1 | 4/2000 |
| WO | 0129580 A1 | 4/2001 |
| WO | 2004092771 A2 | 10/2004 |
| WO | 2005062075 A1 | 7/2005 |
| WO | 2006014750 A2 | 2/2006 |
| WO | 2007070499 A2 | 6/2007 |
| WO | 2008144492 | 11/2008 |
| WO | 2010002600 | 1/2010 |

OTHER PUBLICATIONS

Moldoveanu, et al; Full Azimuth Imaging Using Circular Geometry Acquisition; Leading Edge; vol. 27, No. 7; pp. 908-913; Jul. 2008.

PCT Search Report and Written Opinion; PCT/US2009/031396; May 14, 2009.

IPAU Examination Report (Jun. 21, 2012); AU 2008254856.

SIPO Rejection Decision (Jun. 6, 2012) and SIPO Office Actions (Feb. 6, 2012 and Jul. 20, 2011); CN 200880021257.8.

Mexican associate reportings dated Jul. 2012, Oct. 2011, and Apr. 2011 for IMPI Office Actions; MX/a/2009/012362.

UKIPO Examination Reports (May 18, 2012 and Feb. 13, 2012); GB 1019199.7.

Mexican associate reportings dated Aug. 2012 and Mar. 2012 for IMPI Office Actions; MX/a/2010/013018.

IPAU Examination Report (May 16, 2008); AU 2006252148.

SIPO Office Action (Nov. 19, 2010); CN 200710003980.0.

UKIPO Examination Reports (Jun 8, 2010 Mar 17, 2010 Nov. 13, 2009 Aug. 10, 2009 and Feb. 6, 2009) and UKIPO Search Report (Jul. 18, 2007); GB 0700970.9.

Mexican associate reporting dated Jun. 2009 for IMPI Office Action; PA/a/2007/000733.

Combined Search and Examination Report of British Application No. GB1216841.5 dated Oct. 16, 2012: pp. 1-4.

Moldoveanu; "Circular Geometry for Wide-Azimuth Towed-Streamer Acquisition"; EAGE; Jun. 2008.

Hennenfent, et al.; "Simply Denoise: Wavefield Reconstructions via Jittered Undersampling"; Geophysics; vol. 73(2); pp. v19-v28; May-Jun. 20080

Hennenfent, et al.; "Random Sampling: New Insights into the Reconstruction of Coarsely-Sampled Wavefields"; SEG Annual Meeting; pp. 2575-2579; Oct. 2007.

WesternGeco Q-Technology URL: http://www.westerngeco.com/content/services/q_technology/index.asp 2006.

(56) References Cited

OTHER PUBLICATIONS

Bacon, et al.; "3-D Seismic Interpretation"; Cambridge University Press; pp. 18-22 and 25-26; 2003.
Sukup; "Wide Azimuth Marine Acquisition by the Helix Method": The Leading Edge; pp. 791-794; Aug. 2002.
Pan; "Single-Sensor Towed Streamer Improves Seismic Acquisition"; Offshore; Apr. 2002.
Wong, et al.; "Sampling with Hammersley and Halton Points"; 2 Journal of Graphics Tools; pp. 9-24; 1997.
Reilly, et al; "Concentric Circle 3D: Optimization of Salt Diapir Flank Imaging UK Central North Sea"; First Break; vol. 12, No. 9; pp. 463-475; Sep. 1994.
Cole, et al.; "A Circular Seismic Acquisition Technique for Marine Three Dimensional Surveys"; Offshore Technology Conference, 4864; Houston, Texas; May 6-9, 1985.
PCT Search Report and Written Opinion; PCT/US2010/062419; Sep. 26, 2011.
PCT Search Report and Written Opinion; PCT/US2010/035063; Dec. 29, 2010.
PCT Search Report and Written Opinion; PCT/US2009/060864; May 1, 2010.
PCT Search Report and Written Opinion; PCT/US2009/063538; Apr. 30, 2010.
PCT Search Report and Written Opinion; PCT/US2009/047015; Feb. 24, 2010.
PCT Search Report and Written Opinion; PCT/US2009/047019; Jan. 7, 2010.
PCT Search Report and Written Opinion; PCT/US2008/063875; Sep. 16, 2009.
UKIPO examination report (Aug. 10, 2009) and search report (Aug. 7, 2009) for GB 0912870.3.
Beasley, et al.; A New Look at Simultaneous Sources; SEG Expanded Abstracts; 1998.
Examination Report of British Application No. GB1019201.1 dated Jul. 2, 2012: pp. 1-3.

* cited by examiner

MARINE SEISMIC STREAMER SYSTEM CONFIGURATIONS, SYSTEMS, AND METHODS FOR NON-LINEAR SEISMIC SURVEY NAVIGATION

BACKGROUND

Marine seismic exploration investigates and maps the structure and character of subsurface geological formations underlying a body of water. One or more streamer cables containing acoustic seismic receivers are deployed into the water behind a vessel, and one or more sources may be towed by the same or different vessel. Less than perfect knowledge of the actual positions of the source at the time of firing and receivers at the time of arrival of reflected seismic waves may result in less than acceptable seismic data.

Most marine seismic surveys are acquired in straight lines and with parallel streamers that have constant separation. Thus most acoustic distance measuring systems have a fixed acoustic range length expectation. This length is used to set up the transmitter/receiver pairs in a configuration file, sometimes referred to as a "set-up file" of nominal separations, which is used to control the acoustic devices.

Of all previously known acoustic ranging systems employed in seismic data acquisition, only systems employing intrinsic ranging by modulated acoustics (IRMA) are integrated inline to the streamer. Historically all other acoustic ranging systems are provided by a third party in the sense that they are adapted to various streamers by attaching externally to the coil lines and are not tightly integrated with the software that transforms the acoustic and other positioning measures to coordinates for source and receivers in the seismic acquisition spread. These third party acoustic ranging systems can have difficulty if the relation between acoustic transmitting and receiving units change significantly in relation to the set-up file of nominal separations.

When any particular transmitter/receiver pair changes their relative position beyond the distance constraints that apply for the acoustic system, the relative position measurement may be lost. This may occur for example during network changes from straight line to curved line, in areas where the current changes feather or when coil shooting with varying radii of curvature. If this continues for a large number of measurements, the network quality decreases, and may lead to operational down time (also called non-productive time) if the relative positioning specifications are not met.

It is known in some instances to have the user manually update the approximate separations between transmitter and receiver in order to keep the acoustic ranging system functioning (this method may be referred to as manual range tracking). This is critical since many of these systems must separate the measurement times by time sharing transmissions in order for the transmissions not to interfere with each other. This constraint limits the length of the acoustic recording time and thus the range length and optimum transmitter/receiver pairs.

In periods when the transmitter/receiver pairs become poorly matched due to relative change in separation, acoustic range information may be missing from the network solution. In this case, there is a dependency on compass measures to control the crossline position estimate, while the inline acoustics are not so sensitive to streamer dynamics and will continue to track.

Another known method for range tracking is use of signal-to-noise ratio ("s/n") as a guide for how the range is changing. This method depends on both a good s/n and no competing signal from reflections. Reflecting surfaces can be the sea bottom, sea surface, or other density interface. A diabolical situation is when there is refraction of most of the direct acoustic signal making it weak compared to a signal reflection that is not different from the direct by more than the record length. In this case the reflection gives the best s/n and can cause a tracking method to lock onto the reflection signal rather than the direct signal.

Range tracking has been used for acoustic systems such as IRMA to reduce the cpu needed to correlate ranges. However, it is not known to have been applied to systems that operate with set-up files pairing positioning sources and receivers in a timing sequence that avoids interference from reflection signals.

SUMMARY

When towing marine streamers non-linearly, for example through a turn, or when feather changes for straight streamers, or during coil shooting, a problem with acoustic networks occurs when streamers move inline relative to each other. This disclosure describes marine seismic streamer system configurations and methods of marine seismic data acquisition for use during any seismic survey navigation, and in particular during non-linear seismic survey navigation, that overcomes this problem. As used herein the term "non-linear" refers to the navigation path of the streamer tow vessel during at least a portion of a marine seismic survey. The term "non-straight" is used interchangeably with the term "non-linear".

In one aspect, the present disclosure describes a method for determining by acoustic ranging relative positions of marine seismic streamers in a network of streamers, the network comprising a plurality of acoustic positioning transceiver pairs, the method comprising first implementing a network solution-based reconfiguration of the acoustic transceiver pairs (for example continuously or intermittently recomputing the acoustic configuration file automatically based on the latest network shape detected), and then, when the network of streamers changes more than a critical amount, acoustically reconfiguring the network, the critical amount being when the network solution-based reconfiguration is no longer adequate to provide enough acoustic signals to give reasonable relative positions of the acoustic transceiver pairs in the network due to their spatial relation.

As used herein the term "acoustically reconfiguring" means physically changing the network, whereas the term "solution-based reconfiguring" means changing, assisting, or guiding the software algorithm (and/or data input into the algorithm) used to maintain an acceptable amount of acoustic network positioning data. In certain embodiments, "assisting or guiding" may comprise range tracking. The definition of "range tracking" for this disclosure is to use the computed solution, thought to be correct by virtue of QC factors available, to determine the separation between all transmitter and receiver pairs. Range tracking may be employed to update the set-up or job file, exclude reflected ranges from the record containing the signal traveling along the direct path, and/or find an intermittent acoustic signal (one that is weak for a period but then becomes detectable and useful again).

In most acoustic navigation systems currently employed in seismic data acquisition, there may be periods when signal to noise may be marginal. This includes pulse and coded/cross-correlation signal types. In certain embodiments described herein, in order to focus in the most likely part of the record to identify the signal, it is useful to guide the signal detection algorithm. This can be done by using the most recently computed distance between the positioning acoustic transmitters and receivers through the acoustic network. This method of range tracking uses the power all the acoustical information available at one epoch to guide the search for the signal at the next epoch. The method is also extremely valuable when the transmitter to receiver distances change by more than the record length as when shooting along non-straight trajectories, like a turn.

This disclosure describes methods and systems employing a tight integration between acoustic network solver and acoustic range tracking system to follow the range change through periods of high dynamics. Thus all ranges used in the network solution contribute to defining the separation between any transmitter and receiver pair. This information is used to update the set-up files described above for systems using such files or information. It is also valuable in acquisition methods such as coil shooting, where streamers are in addition to experiencing varying curvature, are also experiencing additional dynamics by being exposed to current coming from different directions as they progress through a coil.

Another problem addressed by relating the range length to a recent solution is reflections. Tracking a range reduces the probability of detecting a reflection. Unless the reflection is very similar in length to the direct signal, it will not appear in the search region of the record. For example, if the difference between direct and reflection is greater than 5 meters, the detection region can be as small as 5 meters. As long as the transmitter/receiver separation does not change by more than 5 meters in one measurement cycle, the direct range can be found in the narrow 5 meter band of the record, given an adequate s/n.

In those cases where there is a temporary drop in the s/n, for some number of measurement cycles for example, in certain embodiments described herein the relation between transmitter and receiver can still be known based on other acoustic ranges that have an adequate s/n. When the weak range again strengthens, the detection algorithm will be searching in the correct narrow record area to find it based on other acoustic ranges that contributed to establishing the separation between the intermittent transmitter/receiver pair.

In certain embodiments, acoustically reconfiguring the network comprises deploying longer streamers on the outside of the turn, i.e., designing a marine seismic survey knowing in the planning stage what the outer streamer radius of curvature will be, and deploying streamers having a length so that in the tightest turn planned the inner streamers during a turn will still maintain a predetermined minimum of acoustic connections to some or all of the outer streamers during a turn.

In other embodiments, acoustically reconfiguring the network comprises designing a marine seismic survey in which some or all of the streamers are longer than the geophysical requirement, the "extra" length being used only for acoustic positioning. Thus traces at the end of the outer streamers during a turn may not be well positioned but are not critical for the geophysical objective.

In certain embodiments acoustically reconfiguring the network comprises use of multi-vessel networks. In multi-vessel marine seismic data acquisition, acoustic ranges from other vessels involved in the survey are used to augment weak parts of the acoustic network that have changed shape.

In some embodiments, advancements in satellite positioning technology may supplement the disclosed systems and methods, as further described herein.

The described methods may be used in 3-D and 4-D marine seismic data acquisition, wherein the data may be selected from seismic data, electromagnetic ("EM") data, and both seismic and EM data. Apparatus for carrying out the methods are also described and are another aspect of the present disclosure.

BRIEF DESCRIPTION OF THE DRAWINGS

The manner in which the objectives of the methods and systems of this disclosure and other desirable characteristics may be obtained is explained in the following description and attached drawings in which.

DETAILED DESCRIPTION

In the following description, numerous details are set forth to provide an understanding of the present disclosure; however, it will be understood by those skilled in the art that the methods and systems may be practiced without these details and that numerous variations or modifications from the described embodiments may be possible.

In many towed streamer marine seismic data acquisition methods, the model of fixed (within some limits) relations between acoustic positioning transmitter/receiver pairs is inadequate. The methods and systems of the present disclosure allows for the acoustic configuration file to be recomputed based on an updated network shape; in certain embodiments the file is automatically recomputed based on the latest network shape. (To avoid unnecessary repetition, the term "network" means acoustic network, unless otherwise explicitly defined otherwise.) This solution-based reconfiguration is most valuable when the acoustic network shape is changing such as during transition from a straight line to a curved line, in areas where the current changes streamer feather, during coil shooting with varying radii of curvature, and similar situations.

While solution-based reconfiguration is useful for maintaining a good network during periods of network shape variation, the inner streamers of a conventionally deployed spread can shift so significantly in a curved shape that solution-based re-configuration does not help. The problem must be solved by providing acoustic ranges of other positioning units to these isolated acoustic points used to position seismic traces of interest. Methods of providing acoustic ranges include deploying streamers of longer length at least on the inner streamers and optionally to deploy streamers longer than are necessary to achieve the geophysical objective, or to augment the missing ranges with additional vessels either dedicated to this task or present for geophysical purposes as part of a multi-vessel survey.

Figure 1:
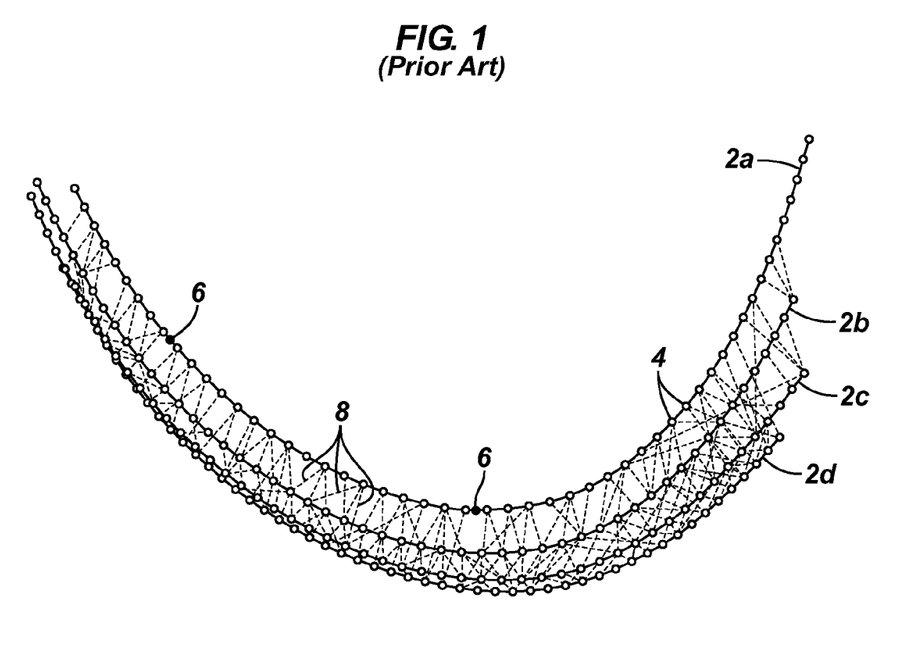
FIGS. 1-3 illustrate prior art streamer configurations during a turn.
Figure 2:
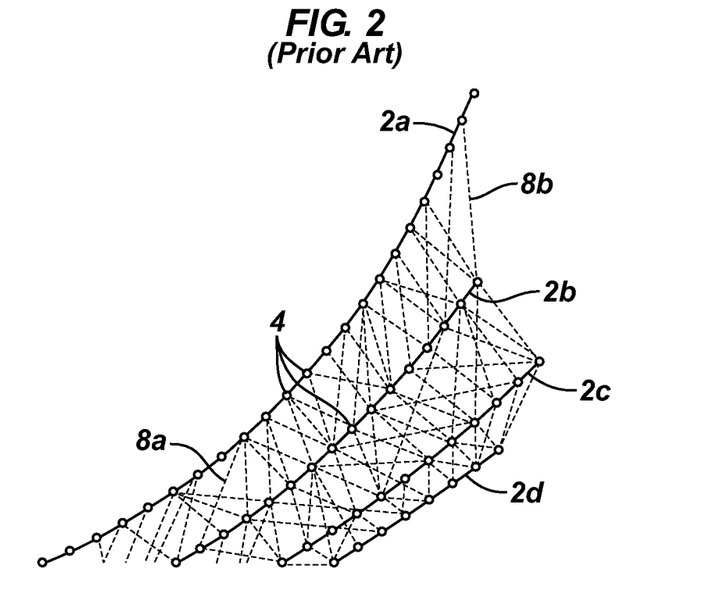
Figure 3:
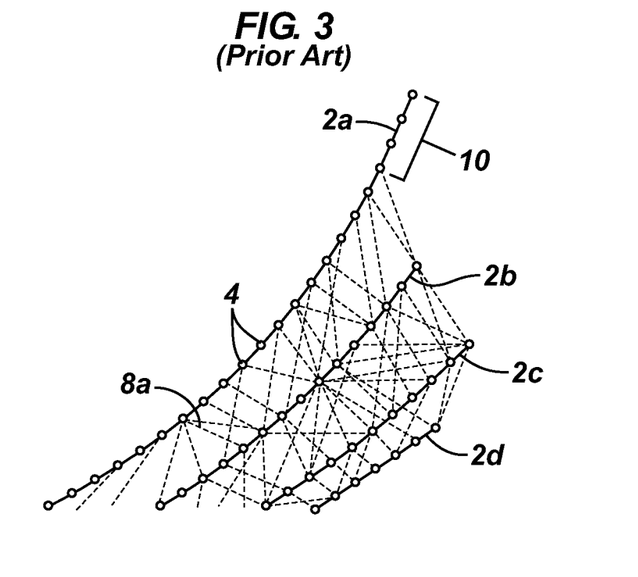

FIGS. 1-3 illustrate prior art streamer configurations during a turn. It is advantageous to acquire seismic data during turns, but if the position of the traces is not adequately determined the traces may not be useful. FIG. 1 illustrates four streamers 2a, 2b, 2c and 2d (more or less could be provided) having a plurality of acoustic positioning transmitters, receivers, or transceivers 4 as is known in the art. Streamers may have streamer positioning devices 6 therealong, such as those known under the trade designation Q-FIN from WesternGeco LLC. Other streamer positioning devices may be used. A tow vessel (not illustrated in FIGS. 1-3) pulls streamers 2a-2d generally to the upper left in each figure, making a turn. One or more seismic source units may be towed as well by the same or different tow vessel, and are not shown. Operation of seismic source units is well known and requires no further description herein. An initial configuration file for acoustic positioning of the streamers is loaded into a computer subsystem on the vessel, and defines pairs of receivers/transmitters that allow positioning by acoustic ranging, as indicated by the dotted lines 8 between the streamers 2a-2d. As seen in the upper right portion of FIG. 1, due to tail end inline shift of the streamers during a turn, a portion of streamer 2a is not adequately positioned by the configuration file. FIG. 2 illustrates that ranges 8a are adequate, but ranges 8b are elongated due to inline shift of streamers 2a and 2b. FIG. 3 illustrates that a portion 10 of streamer 2a is not positioned at all, due to extreme inline shift.

Figure 4A:
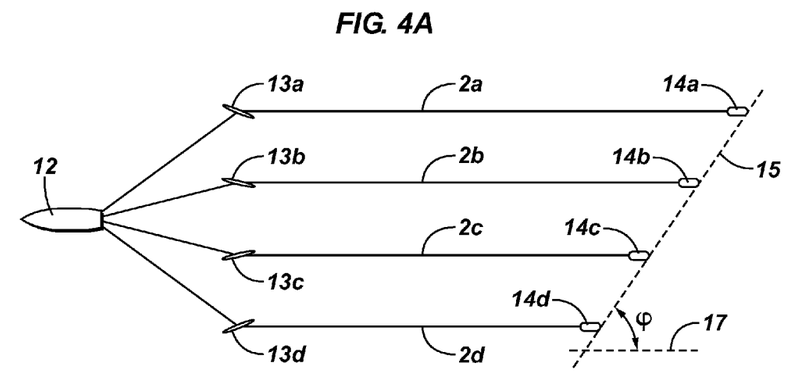
FIGS. 4-6 illustrate marine seismic network configurations within the disclosure.
Figure 4B:
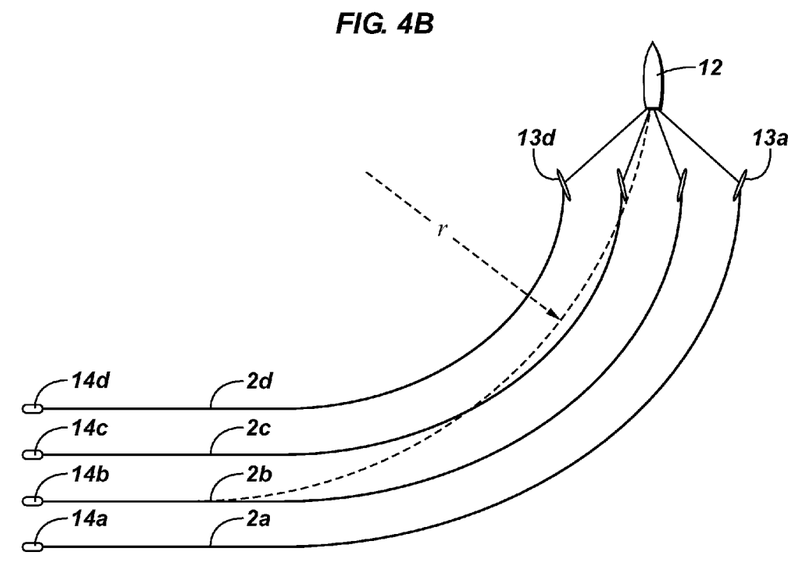
Figure 5:
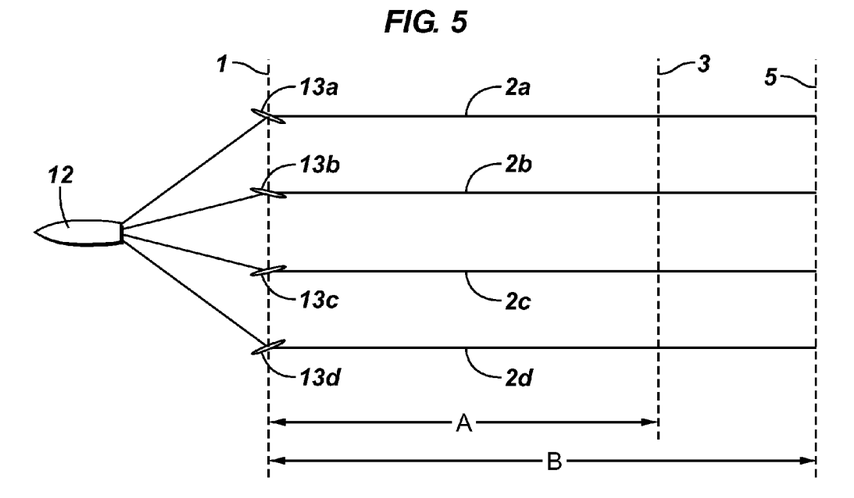
Figure 6:
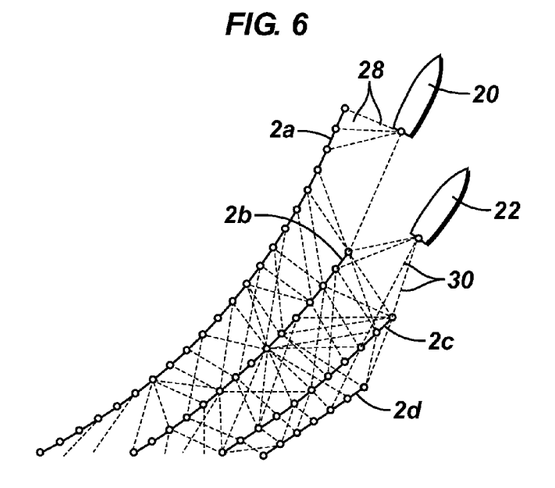

FIGS. 4-6 illustrate acoustic reconfigurations. In FIGS. 4A a vessel 12 is illustrated towing four submerged streamers 2a-2d to the left. Streamers 2a, 2b, 2c and 2d are generally pulled away from center line by deflectors units 13a, 13b, 13c and 13d, as known in the art. Tail buoys 14a, 14b, 14c and 14d are illustrated at the tail ends of steamers 2a, 2b, 2c and 2d, respectively, and are shown forming a line 15 having an angle φ with the heading 17. Acoustic ranges are still acceptable in this configuration, but near the tail buoys the positioning may not be ideal. During a port turn of radius r, as illustrated in FIG. 4B, tail buoys 14a-14d are shown forming a line which is more conducive to acoustic ranging, and therefore the positions of the streamers are much better determined during the turn. As the angle (p becomes smaller, a smaller radius turn may be accommodated, with the tradeoff of poorer acoustic ranges near the tail ends of the streamers when they are traveling linearly. As the angle (p increase toward 90°, a larger radius of curvature turn may be adequately ranged. It should of course be noted that the turn need not be circular; it could be coil-shaped (like a spiral) where the radius changes, or elliptical, or some other shape.

FIG. 5 illustrates an embodiment wherein streamers 2a-2d are longer than required to meet the geophysical requirement. A first length "A" is indicated between lines 1 and 3, which in prior art would have been long enough to meet the design geophysical requirement; distance "B" between lines 1 and 5 indicates that longer streamers may be employed, so that during a turn seismic data can be obtained with confidence that the positions of the streamers will be known with sufficient confidence to avoid a second or further survey to gather data missed on a first survey. The relationship of lengths A and B will vary depending on the survey design, number of streamers, and other parameters, but in general the smaller the turning radius r (FIG. 4B), the longer the streamers should be, in other words the ratio of B/A should be greater as turning radius decreases. Since the extra streamer sections between lines 1 and 3 are used for positioning purpose and not used for geophysical survey purpose, they may be structurally identical to the regular streamer sections that are used for geophysical survey or they may be different. In the former case, the signals from the hydrophones in the extra streamers are used for acoustical ranging, not for recording seismic data. In the later case, the extra streamer sections are compatible for navigation and handling purpose, but internally are structurally different. They only contain acoustic transceivers for the positioning network.

FIG. 6 illustrates another embodiment, wherein multiple vessels are employed to supplement acoustic ranges that are either too weak or not possible with a solution-based reconfiguration. Vessels 20 and 22 provide extra acoustic transmitters (or receivers, or transducers as desired) to provide supplemental ranges 28 and 30, respectfully. Vessels 20 and 22 may be surface vessels or underwater vessels. One or more vessel may be sufficient. Suitable vessels include seismic vessels, work vessels, AUVs, ROVs, and the like. Vessels 20 and 22 which create a minimum of acoustic noise would be used in certain embodiments. Vessels 20 and 22 may or may not communicate and share information with the tow vessel.

Figure 7A:
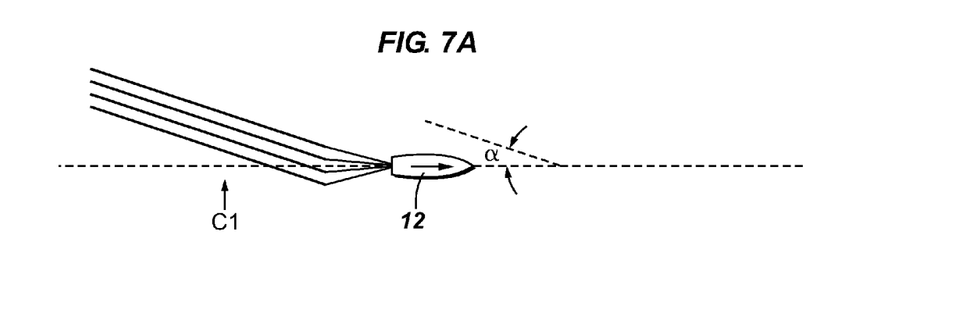
FIG. 7 illustrates a method and system wherein a solution-based reconfiguration is followed by an acoustic reconfiguration.
Figure 7B:
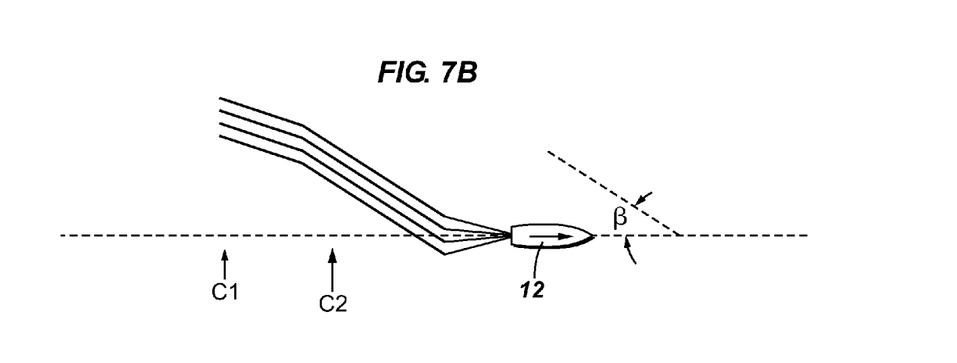
Figure 7C:
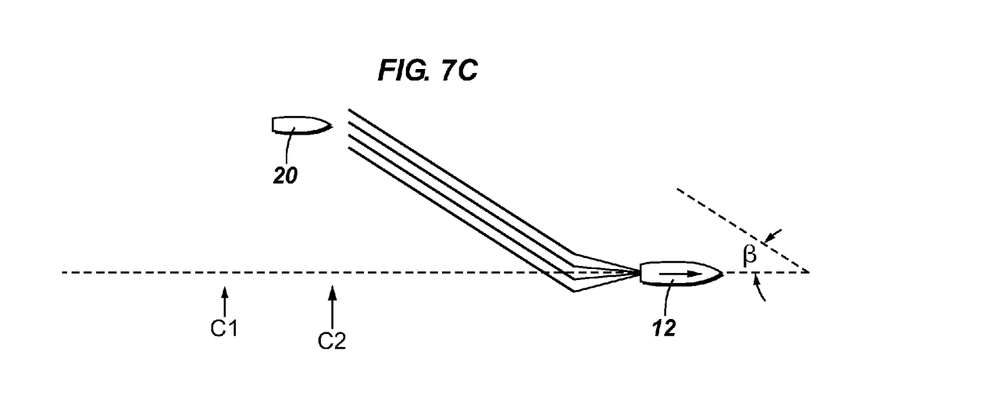

FIG. 7 illustrates a method and system wherein a solution-based reconfiguration followed by an acoustic reconfiguration may be beneficial. In FIG. 7A vessel 12 tows four streamers to the right through a crosscurrent C1 which cause the streamers to feather at an angle α. As vessel 12 and its towed streamers travels further to the right, as depicted in FIG. 7B, a crosscurrent C2 having a magnitude stranger than C1 is encountered by vessel 12 and the portions of the streamers closest to vessel 12, causing a feather angle of β, wherein β>α. In FIGS. 7A and 7B, solution-based reconfigurations, computed continuously or at some regular or irregular time period are able to supply adequate positions of the streamers. However, once the vessel and steamers reach the position illustrated in FIG. 7C, it may be that the solution-based reconfiguration may no longer supply adequate positions toward the ends of the streamers, and an acoustic reconfiguration may be employed for the streamer ends, as indicated by the extra vessel 20 having supplemental acoustic transmitters, or receivers, or transducers (as in FIG. 6). Thus the solution-based reconfiguration may be employed for most of the streamers, while acoustic reconfiguration may be employed near the tail ends of the streamers.

Figure 8:
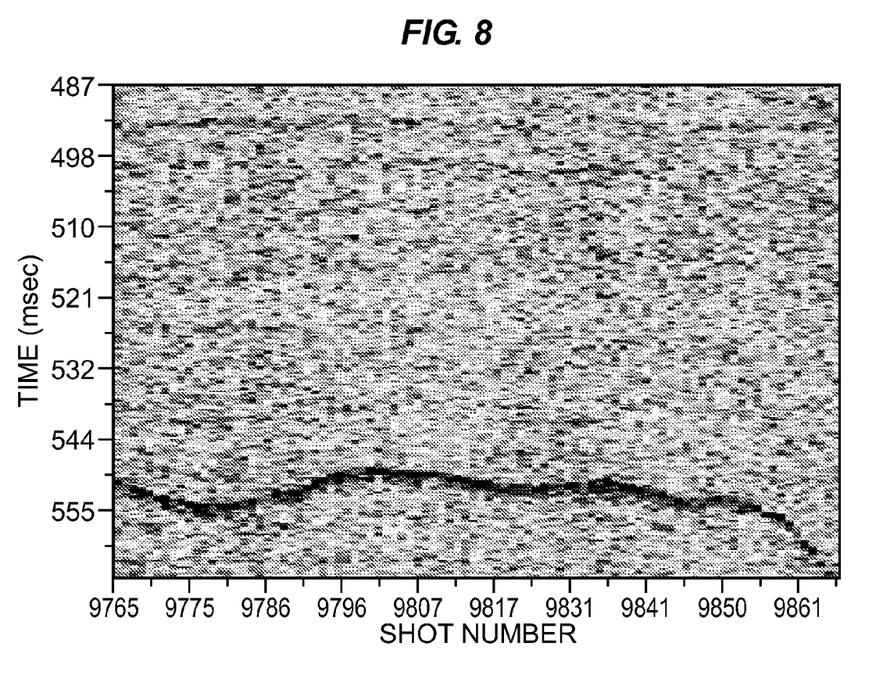
FIG. 8 is an actual record of a prior art range tracking, illustrating a record of range data that is not centered on the signal, and as the range travel time increases (y-axis increases down), the signal migrates out of the recording period.
Figure 9:
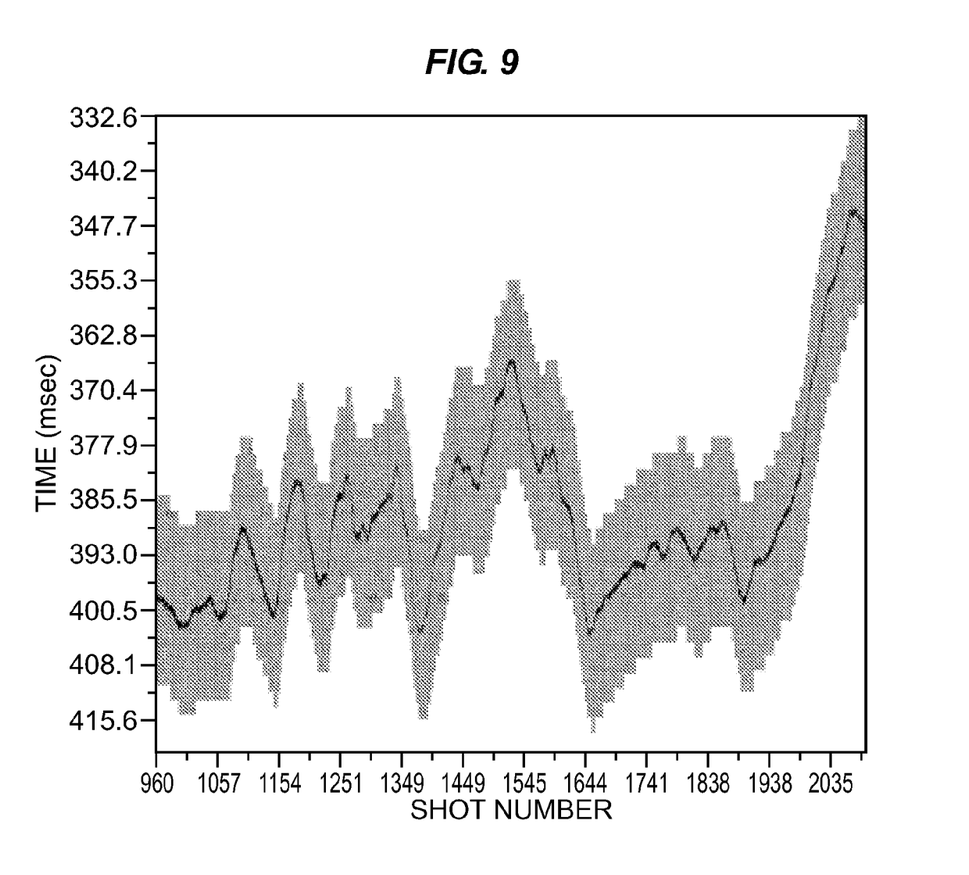
FIG. 9 illustrates a range data record measured in accordance with the present disclosure, illustrating a range data record centered on the signal.

FIG. 8 is an actual record of a prior art range tracking, illustrating a record of range data that is not centered on the signal, and as the range travel time increases (y-axis increases down), the signal migrates out of the recording period; and FIG. 9 illustrates a range data record measured in accordance with the present disclosure, illustrating a range data record centered on the signal. Each shot cycle the computed range between any two transceiver pair, based on the strength of all ranges in the acoustic network combined, is compared to the record center. If the difference between these two is greater than the gating threshold, the record is re-centered on the computed value. This allows the range to be tracked, and insures adequate acoustic distance measurements to keep the network solving even in highly dynamic environments.

Streamers useful in the practicing the various embodiments described herein may comprise any type of marine seismic streamer, and if more than one streamer is present, the streamers may be the same or different, as long as they comprise sufficient acoustic positioning devices to carryout the methods described herein. Suitable streamers include traditional streamers comprising only hydrophones or groups or hydrophones along the length the streamers; multicomponent streamers (streamers having more than one type of seismic sensor, for example having both hydrophones and geophones), and the like. The streamers are typically built up into lengths using sections of streamers. The streamers may also comprise streamer steering devices, which may be attached inline or attached to the outside of the streamers. Streamers will typically include internal strength members, and may include buoyancy means, such as solids, liquids, and even gases. All of these features are explained in detailed elsewhere and are known in the art.

Methods and systems described herein that include either solution-based reconfiguration, acoustic reconfiguration, or both may also take advantage of systems employing measurements that relate a GPS antenna position to one or more acoustic devices that make up part of the seismic spread acoustic network, such as the techniques described in assignee's U.S. patent application Ser. No. 12/049,923, filed on Mar. 17, 2008, and incorporated by reference herein in its entirety. The mentioned patent application describes motion measurement devices that will improve the accuracy of the relation between the GPS or other satellite antenna and one or more acoustic distance measuring devices that make up part of the acoustic network. To avoid unnecessary repetition herein we use the term GPS, it being understood that other satellite positioning systems may be used. One such method comprises determining relative positions of seismic positioning components of a towed underwater seismic network by acoustic ranging; relating the relative positions to a coordinate reference frame provided by one or more satellite positioning antennae attached to a rigid body floating on a surface of a body of water above the seismic network; determining, via acoustic signals, a distance from an acoustic device fixed to the rigid body to an acoustic device which is one of the seismic positioning components of the underwater seismic network; measuring a sufficient number of orientation parameters of the rigid body to determine 3D offset in the coordinate reference frame of the acoustic device fixed to the rigid body; and correcting the distance using the 3D offset on a shipboard sub-system. In certain embodiments the orientation parameters are selected from the group consisting of pitch, roll, yaw, heading, and combinations thereof. In other embodiments the rigid body is selected from the group consisting of a buoy and a seismic source float. In other embodiments the buoy is selected from the group consisting of a steerable buoy and a non-steerable buoy. In certain embodiments the 3D offset is determined sufficiently to provide sub-meter accuracy in the determination of the 3D offset. As used herein the term "sub-meter" means the accuracy is within plus or minus 1 m or less, for example within plus or minus 0.9 m, or plus or minus 0.8 m, plus or minus 0.5 m, or plus or minus 0.3 m, or even plus or minus 0.1 m. In certain embodiments the rigid body may be a buoy, for example one or more streamer tail buoys or streamer front end buoys. The buoys may be simply towed by a vessel or streamer (having no power or steering mechanism integral therewith, i.e. only passively steerable), or may be actively steerable. "Actively steerable" means a device comprising its own mechanism for changing its position, such as a rudder, one or more wings, hydrofoils, ailerons, and the like, and does not include passively steerable devices. An actively steerable device may or may not receive signals from a remote device, either by wire or wireless transmission, indicating what changes in position are desired. "Actively steerable" does not include devices able to be steered only by virtue of being connected to another device which is actively steerable, such as a marine tow vessel, work vessel, ROV, or similar vessel. In certain embodiments the component of the underwater network is a single streamer and the acoustic ranging is performed between sections of the streamer. In other embodiments the components are more than one streamer, and the relative positions determined are relative positions between two or more streamers. The steamers may comprise acoustic seismic sensors, electromagnetic (EM) sensors, or both. In certain embodiments measuring motion of the rigid body comprises using one or more inertial measuring units, such as accelerometers, gyroscopes, and the like. In certain embodiments measuring motion of the rigid body comprises measuring orientation of at least three satellite antennae fixed to the rigid body. In other embodiments measuring motion of the rigid body comprises measuring heading, inclination to vertical in cross line and inline tow directions.

Another method comprises determining relative positions of components of a towed underwater seismic network by acoustic ranging, the underwater seismic network comprising a streamer tail buoy connected to a streamer, the buoy having one or more satellite antennae fixed thereto and projecting above water; and relating coordinates of one of the satellite antennae to coordinates of an acoustic node in a reference frame, the acoustic node being on or in a non-horizontal portion of the streamer at a point shipward from the buoy and at a known distance from the buoy, comprising measuring inclination, depth, and crossline angle of the non-horizontal portion at the point.

In certain embodiments, seismic streamers are positioned relative to each other by acoustic ranging. These relative positions are then related to an earth fixed coordinate reference frame typically provided by satellite (for example, GPS, GLONASS, or other satellite positioning system, or combination thereof) control points on towed buoys (tail or streamer front buoys) on the sea surface above the submerged streamers. An acoustic device is employed that determines a distance from the towed buoy to one or more of the submerged components (whose relative positions are known). The physical connection or tie between the satellite antenna and the acoustic device is a key component of positioning accuracy. The physical connection must not changed in length detrimentally (more than a few centimeters) over the course of the positioning methods. In certain embodiment, inclinometers, a pressure sensor to determine depth, and a compass may be employed, wherein these instruments are integrated in or attached to a section between the rigid body on which one or more GPS antennae (one antenna is sufficient in certain embodiments) are mounted and an acoustic node in the seismic network. One advantage of this method is that it relates the GPS antenna point and acoustic points without having an acoustic node rigidly attached to the rigid body. A rigid attachment of an acoustic device to a rigid body has caused, in certain instances, acoustic performance problems for transmission, as the deeper the transmitter the better the acoustic signal. Acoustic receivers near the ocean surface are contaminated by sea surface noise, and apparatus such as a rigid pole attached to a floating surface device such as a tail buoy poses a towing risk as the pole may encounter debris in the ocean during tow and be damaged. Further a deployment and retrieval solution is needed to protect the pole and acoustic unit during these operations.

Although only a few exemplary embodiments have been described in detail above, those skilled in the art will readily appreciate that many modifications are possible in the exemplary embodiments without materially departing from the novel teachings and advantages of the methods and systems disclosed herein. Accordingly, all such modifications are intended to be included within the scope of this disclosure as defined in the following claims.

What is claimed is:

1. A method for seismic survey navigation, comprising:
    identifying a plurality of acoustic transceiver pairs in two or more streamers, wherein the plurality of acoustic transceiver pairs is used to generate acoustic network positioning data;
    reconfiguring one or more acoustic transceiver pairs in the plurality of acoustic transceiver pairs based on a plurality of positions of the plurality of acoustic transceiver pairs; and
    deploying one or more acoustic positioning devices proximate to the ends of the streamers when the reconfigured acoustic transceiver pairs are no longer adequate to maintain a predetermined amount of the acoustic network positioning data, wherein the acoustic positioning devices are disposed on one or more vessels located proximate to the ends of the streamers.

2. The method of claim 1, wherein reconfiguring the acoustic transceiver pairs comprises changing the identified plurality of acoustic transceiver pairs to maintain the predetermined amount of the acoustic network positioning data.

3. The method of claim 2, wherein changing the identified plurality of acoustic transceiver pairs comprises range tracking.

4. The method of claim 3, wherein range tracking comprises determining a plurality of ranges between the plurality of acoustic transceiver pairs.

5. The method of claim 1, wherein the plurality of positions of the plurality of acoustic transceiver pairs are determined with reference to one or more satellite positioning sub-systems.

6. The method of claim 1, wherein the predetermined amount of the acoustic network positioning data is used to determine one or more relative positions of at least a portion of the plurality of acoustic transceiver pairs.

7. The method of claim 1, wherein the acoustic positioning devices are configured to add additional acoustic network positioning data to maintain the predetermined amount of the acoustic network positioning data.

8. The method of claim 1, wherein the predetermined amount of the acoustic network positioning data is used to determine two or more positions of the ends of the streamers during a turn.

9. A marine seismic streamer system, comprising:
one or more seismic sources; and
one or more streamers each of which has a length that is longer than a minimum length required to perform a survey based on a number of the streamers and a survey design, wherein the length beyond the minimum length is used for acoustic positioning, and wherein a ratio of the length to the minimum length is based on a radius of a turn during the survey.

10. The marine seismic streamer system of claim 9, wherein the streamers comprise a first set of acoustic devices for acoustic positioning along the length beyond the minimum length.

11. The marine seismic streamer system of claim 9, wherein at least some of the streamers are multicomponent streamers.

12. The marine seismic streamer system of claim 9, wherein the ratio varies inversely with the radius.

13. The marine seismic streamer system of claim 9, wherein the radius is a minimum radius of the turn.

14. The marine seismic streamer system of claim 9, wherein the length beyond the minimum length is only used for acoustic positioning.

15. The marine seismic streamer system of claim 9, wherein the length beyond the minimum length is not used to acquire seismic data.

16. A marine seismic streamer system, comprising:
one or more seismic sources;
a first streamer having a first plurality of acoustic positioning devices disposed at an end of the first streamer, wherein the first streamer has a first length; and
a second streamer having a second plurality of acoustic positioning devices disposed at an end of the second streamer, wherein the second streamer has a second length that is longer than the first length such that the end of the second streamer extends beyond the end of the first streamer, and wherein the first plurality of acoustic positioning devices and the second plurality of acoustic positioning devices are configured to be within a predetermined range during a turn in the survey.

17. The marine seismic streamer system of claim 16, wherein the end of the first streamer and the end of the second streamer form a line that is at an angle with a heading direction of a vessel towing the first streamer and the second streamer, wherein the angle is determined based on a radius of the turn.

18. The marine seismic streamer system of claim 17, wherein the angle is proportional to the radius.

19. The marine seismic streamer system of claim 16, wherein the turn is circular, coil-shaped, elliptical or combinations thereof.

20. The marine seismic streamer system of claim 16, wherein the second streamer is on the outside of the turn.

* * * * *